R. C. HOFFMAN.
PROCESS OF MAKING DISK WHEELS AND RIMS.
APPLICATION FILED OCT. 11, 1919.

1,376,622.

Patented May 3, 1921.

INVENTOR.
ROSCOE C. HOFFMAN.
BY
*Lockwood & Lockwood*
ATTORNEYS

UNITED STATES PATENT OFFICE.

ROSCOE C. HOFFMAN, OF INDIANAPOLIS, INDIANA.

PROCESS OF MAKING DISK WHEELS AND RIMS.

1,376,622.  Specification of Letters Patent.  Patented May 3, 1921.

Application filed October 11, 1919. Serial No. 330,062.

*To all whom it may concern:*

Be it known that I, ROSCOE C. HOFFMAN, a citizen of the United States, and a resident of Indianapolis, county of Marion, and State of Indiana, have invented a certain new and useful Process of Making Disk Wheels and Rims; and I do hereby declare that the following is a full, clear, and exact description thereof, reference being had to the accompanying drawings, in which like numerals refer to like parts.

This invention relates to a process of forming a disk wheel and tire rim so as to greatly simplify the manufacture thereof, whereby the disk wheel and the greater portion of the rim will be integral, the other portion of the rim being formed and interlocked therein without riveting or welding. This process will not only minimize the cost of production in manufacturing disk wheels and rims, but will greatly add to the strength thereof.

Figure 1:
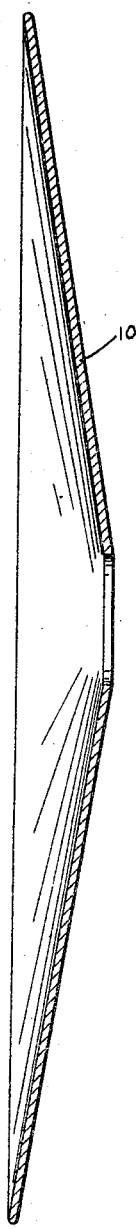
Figure 2:
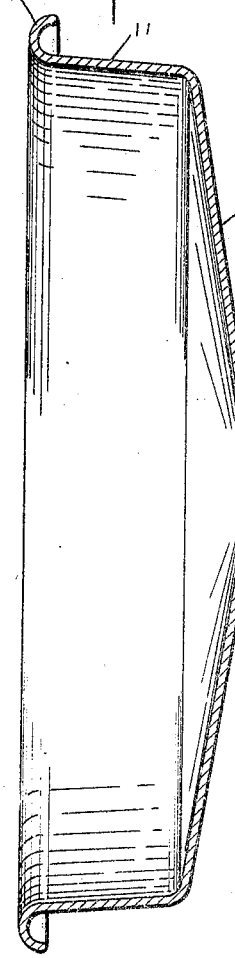
Figure 3:
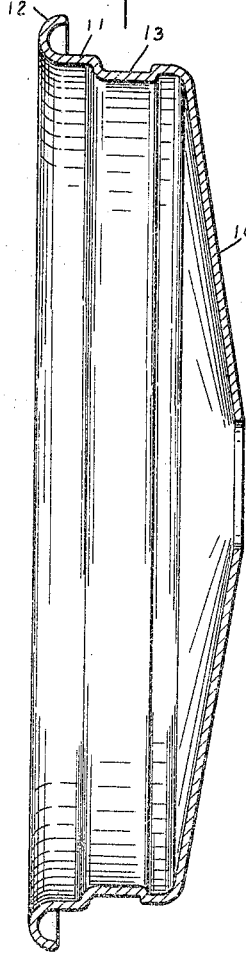
Figure 4:
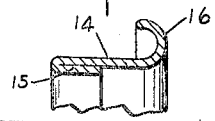
Figure 5:
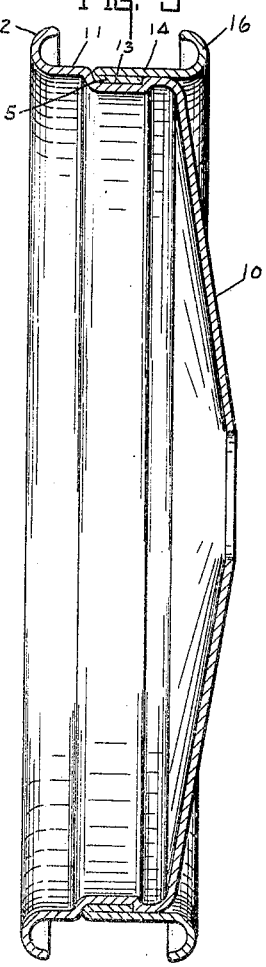
Figure 6:
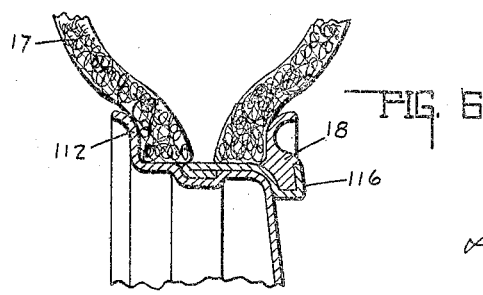

In the drawings, which are made a part of this application, Figure 1 is a central cross section taken through a disk wheel blank. Fig. 2 is the same as Fig. 1 showing the integral portion of the rim drawn out. Fig. 3 is the same as Fig. 2 showing a depression or peripheral channel rolled in the periphery of the rim. Fig. 4 shows a section taken through a portion of the rim member to be mounted thereon. Fig. 5 is the same as Fig. 3 showing the rim member mounted in position and the full assembly of the disk and rim. Fig. 6 shows a section of a portion of an assembled rim and wheel adaptable for straight side tires.

The process consists of stamping out a blank sheet metal disk 10, as shown in Fig. 1, having substantially the same contour as the disk wheel. This blank is then drawn out into the form shown in Fig. 2 so as to form a rim member 11 integral therewith, having a turned over flange 12 adapted to engage the bead upon a tire casing of the clencher type. The form shown in Fig. 2 is then rolled so as to obtain a depression or channel 13 about the entire periphery of the rim 11.

The rim member 14, which has its inner edge folded over to form a shoulder 15, has its ends butt-welded so as to be circular, with its outer edge rolled so as to provide a flange 16 for engaging the bead of a clencher type casing on the opposite side from the flange 12. The rim 14 is assembled on the rim 11 by forcing said rim member over the rim 11, so that the folded shoulder 15 will drop into the channel 13, whereby it will lock therein and secure the rim members together. The rim 11 will receive the stress and strain of the weight applied upon the wheel, whereas the member 14 will have only a lateral force exerted thereon, which will be met by the shoulder 15 embedded in the channel 13.

Fig. 6 shows the same process and construction excepting that the clencher flange 112 is substituted for the flange 12 adapted to engage and secure a casing 17 of the straight side type, and the clencher flange 116 is substituted for the flange 16 in which is secured a detachable ring 18 in position to engage the other side of the straight side casing 17.

The invention claimed is:

1. The process of forming a disk wheel and rim consisting of stamping out a sheet metal disk, drawing out a rim from said disk, rolling a peripheral depression around said rim, and securing an oppositely extending rim member to said first mentioned rim, by forcing one rim over the other, said rims having means for engaging each other whereby one of said rims will interlock with the other.

2. The process of forming a disk wheel and rim consisting of stamping out a sheet metal disk, drawing out a rim from said disk, forming a flange on said rim, rolling a peripheral depression around said rim, and securing an oppositely extending rim member, having an oppositely formed flange thereon, to said first mentioned rim by forcing one rim over the other, the second mentioned rim having an enlarged edge which forms a shoulder engaging in the depression, whereby it will lock therein.

3. The process of forming a disk wheel and rim consisting of stamping out a sheet metal disk, drawing out a rim from said disk, forming a flange on said rim, rolling a peripheral depression around said rim, and securing an oppositely extending rim member, having an oppositely formed flange thereon, to said first mentioned rim by forcing one rim over the other, the second mentioned rim having an oppositely flanged edge which forms a shoulder engaging in the depression whereby it will lock therein.

In witness whereof I have hereunto affixed my signature.

ROSCOE C. HOFFMAN.